United States Patent [19]

Delagi et al.

[11] 3,858,182

[45] Dec. 31, 1974

[54] COMPUTER PROGRAM PROTECTION MEANS

[75] Inventors: Bruce A. Delagi, Acton; David L. Stone, Framingham; David Cutler, Acton; Robert C. Gray, Cambridge, all of Mass.

[73] Assignee: Digital Equipment Corporation, Maynard, Mass.

[22] Filed: Oct. 10, 1972

[21] Appl. No.: 296,027

[52] U.S. Cl. .................... 340/172.5
[51] Int. Cl. .................... G06f 13/00
[58] Field of Search .................... 340/172.5

[56] References Cited

UNITED STATES PATENTS

| | | | |
|---|---|---|---|
| 3,562,717 | 2/1971 | Harmon et al. | 340/172.5 |
| 3,573,736 | 4/1971 | Schaleppi | 340/172.5 |
| 3,599,159 | 12/1971 | Creech et al. | 340/172.5 |
| R27,239 | 11/1971 | Ulrich | 340/172.5 |

OTHER PUBLICATIONS

"PDP 11/(Model) 20, 15, r20 Processor Handbook" Digital Equipment Corp., Maynard, Mass., 1971.
"PDP 11/45 Hanbook (Preliminary Edition)" Digital Equipment Corp., Maynard, Mass., 1971.
Clayton et al., "Minicomputers Move Up With Mixed Memories," Electronics, McGraw-Hill Inc., N.Y., Oct. 11, 1971.

*Primary Examiner*—Gareth D. Shaw
*Assistant Examiner*—Michael Sachs
*Attorney, Agent, or Firm*—Cesari and McKenna

[57] ABSTRACT

In a computer system of sufficient extent to permit a plurality of users, each having access to a virtual machine, the executive program is divided into two components; viz: a supervisor program and a kernel program. Certain potentially dangerous instructions are permitted only in the kernel mode, and mode control is effected by the utilization of a processor status word which includes a plurality of fields which place restrictions on the running program in accordance with the mode thereof. Additionally, two separate sets of general registers are provided in the system, and the general register set being utilized is specified in the current processor status word. Under hardware control, the utilization of the general register sets is limited according to the current mode specified in the processor status word.

6 Claims, 2 Drawing Figures

| BITS | FUNCTION | DESCRIPTION |
|---|---|---|
| 15-14 | CURRENT MODE | SELECT THE PROCESSOR OPERATING MODE:<br>00 = KERNEL<br>01 = SUPERVISOR<br>10 = NOT USED<br>11 = USER |
| 13-12 | PREVIOUS MODE | HOLDS THE PROCESSOR MODE THAT WAS IN EFFECT PRIOR TO THE LAST TRAP OR INTERRUPT, FOR USE IN COMMUNICATION (MT/FP) INSTRUCTIONS |
| 11 | REGISTER SET | SELECTS ONE OF TWO REGISTER SETS FOR GENERAL REGISTERS 0 THROUGH 5 |
| 10-8 | NOT USED | |
| 7-5 | PRIORITY | SELECTS ONE OF EIGHT PROCESSOR PRIORITY LEVELS THAT CONTROL SCHEDULING OF INTERRUPT SERVICE ROUTINES |
| 4 | TRACE BIT | CONTROLS OPERATION OF A TRAP FUNCTION USED IN PROGRAM DEBUGGING |
| 3-0 | CONDITION CODES | USED TO STORE INFORMATION ABOUT THE VALUE OF THE RESULT OF THE LAST DATA OPERATION |

FIG. 2

COMPUTER PROGRAM PROTECTION MEANS

BACKGROUND OF THE INVENTION

This invention relates to data processing systems in which a plurality of users are each given access to a virtual machine and, more particularly, to means for protecting the executive program and other user programs from unauthorized or inadvertent access or damage from a user program.

Contemporary computer systems often are accessible by a plurality of users. In order to provide maximum convenience to each user, he is provided with a virtual machine. The individual programmer writes his program as though it is to be run by itself, and the program may use all the system resources accordingly. The system provides the services necessary to support the program and coordinate it with other programs in operation. The physical hardware in the system is combined with an executive program to simulate a more powerful hardware machine for which the programs are written.

The proprietary nature of some information contained in the programs and stored data of individual users and the manifest necessity for protecting the executive program and the programs of other individual users from indiscretion of a particular user program require protection for the system that supports the virtual machines as well as the virtual machines themselves.

It is therefore a broad object of this invention to provide improved program protection means in a computer system.

It is a more specific object of this invention to provide an improved protection system for a computer system accessible by a plurality of users on a virtual machine basis.

Many prior computer systems can operate in different "modes". Some systems have an operating mode and one or more interruption modes. In others, memory is sectioned or partitioned and the computer system operating mode depends upon characteristics of the section of memory it is using. For example, a memory may contain one section for storing valid programs and and another for storing programs which are not "debugged". While the computer system may operate without limitation in the one section, it may only operate in a limited mode while using the other section. Another example is the division of programs into general or user routines and executive routines. Usually, there are certain restrictions concerning the operation of instructions in either type of routine. The computer system is then said to be operating in an "executive" mode while executing an executive routine and a "user" mode while processing a general routine.

Whenever the computer system changes its operating mode, the data in internal registers may have to be saved in order not to lose data. Prior systems use two different approaches. In one, each mode change requires that the contents of critical registers be moved to storage locations, usually in a core memory unit. This is a simple approach from a circuit standpoint, but somewhat time consuming. In the second approach a critical set of registers is duplicated for each mode. This minimizes the time necessary to store the registers, and in some cases, eliminates it altogether. However, the additional register circuits increase system cost.

It is another object of this invention to provide means for separating the executive control program of such a computer system into kernel and supervisor components and to provide hardware affording optimum benefit from such segregation of the executive program.

Another object of this invention is to provide a computer system which minimizes the time to change operating modes with a minimum increase in circuit cost.

SUMMARY

In accordance with this invention, a processor status word identifies the current and previous operating modes. The computer system contains a group of registers which can be addressed including a single program counter. There is a register, which acts as a stack pointer, for each mode and the remaining registers are divided into two groups. Other information in the status word identifies a particular one of the two groups to be used. As each stack pointer is associated with one mode, its data need not be stored during a mode change. The program counter contents changes and its old data is not saved. The data in a selected set of general registers may or may not be changed.

Thus, in accordance with our invention, we provide a computer system with a multiple operating mode capability Unlike the prior art, we use a unique configuration of registers which reduces operating times without duplicating a complete set of registers for each mode, thereby reducing expenses.

The subject matter of the invention is particularly pointed out and distinctly claimed in the concluding portion of the specification. The invention, however, both as to organization and method of operation, may best be understood by reference to the following description taken in connection with the accompanying drawing of which the single FIGURE is a major block diagram of a computer system incorporating the present invention.

BRIEF DESCRIPTION OF THE DRAWINGS

FIG. 2 is a table which illustrates the organization of a processor status word useful in the system in FIG. 1.

DESCRIPTION OF AN ILLUSTRATIVE EMBODIMENT

Figure 1:
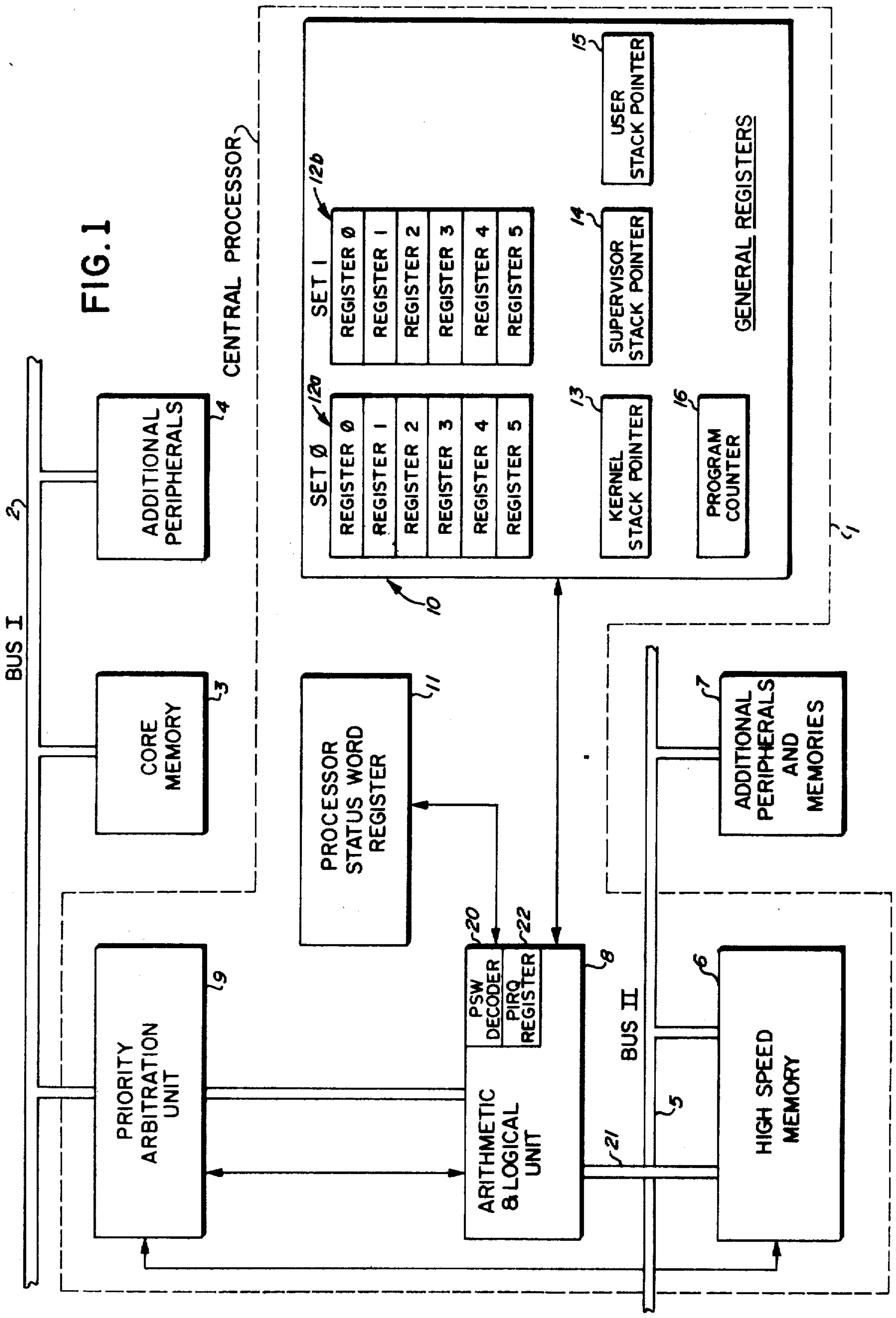
FIG. 1 depicts the organization of a digital computer system constructed in accordance with this invention.

It will be observed that the system of shown in the sole FIGURE utilizes unified bussing architecture in which all devices, including the central processor 1, are connected in parallel to the bus 2 which may be designated BUS I. Hence, the central processor 1 and a wide variety of additional peripherals 4 can dynamically request control of the bus 2 to transfer information to another device using an approach based on real and simulated memory addresses. Thus, the central processor can look on its peripherals as if they were locations in memory with special properties and can operate on them using the same set of instructions used to operate on memory. Devices communicate on the unified bus in a master-slave relationship. During any bus operation, one device has control of the bus. The device in control, called the master, communicates with another device called the slave. The relationship is dynamic such that, for example, the central processor as master may send control information to a disk (slave) which then could obtain the bus as a master to communicate with core memory as a slave. These operations and the circuits for performing them are described in a copending application Ser. No. 24,636, filed Apr. 1, 1970, now U.S. Pat. No. 3,710,324 issued Jan. 9, 1973 entitled DATA PROCESSING SYSTEM and assigned to the same assignee as the present invention.

Core memory 3 and high speed memory 6 are utilized as working memory units by the processor 1. High speed memory 6 communicates with arithmetic and logical unit 8 on a high speed dedicated bus 21 and also with a second BUS 5 which may be jumpered to a BUS 2 or interfaced with another processor,. Additional peripherals and memories 7 may be coupled to the BUS 5 to extend the system. Priority arbitration unit 9 determines the master/slave relationship of the various subsystems coupled to the BUS 2 and also affects the communication between the high speed memory 6, the arithmetic and logical unit 8, and the second BUS 5.

The computer system described in the above-identified U.S. Pat. No. 3,710,324 contains eight general registers designated R0–R7 registers. The R7 register is the program counter. The R6 register can be used as a stack pointer. The R0 through R5 registers are general registers. In accordance with the prior art, we might elect to either retain these eight registers and then save their contents with each mode change or duplicate all the registers for each mode. In terms of a three-mode machine this would mean the use of 24 registers.

In accordance with our invention, the arithmetic and logical unit 8 utilizes a group of sixteen individually addressable general registers 10. These general registers include two sets of six registers each, set 0 12*a* and set 1 12*b* as well as a kernel stack pointer 13, a supervisor stack pointer 14, a user stack pointer 15, and a program counter 16.

The processor status word register 11, whose function will be described in detail below, is also individually addressable, and information temporarily stored therein is interpreted by processor status word decoder 20, a section of the arithmetic and logical unit 8.

The central processor 1 executes instructions and operates on data, both of which are stored in memory units (such as core memory 3 and high speed memory 6), and it responds to various asynchronous events. The response to an interrupt or trap is not entirely built into the processor hardware. Instead, the response is controlled by a series of instructions (a program) which is selected by a simpler hardware response when the asynchronous event is detected. Often, a number of programs are required to respond to a number of events, and the scheduling, coordination, and interaction of these programs is one of the most important (and difficult) parts of programming a computer system.

In many applications, the user programs that are written for the system are treated as though they are interrupt response programs. This is done to simplify the scheduling, to allow each user program to operate with a terminal (some form of character input/output device), and to allow several user programs to operate at once. By running several programs at once, the processor can be utilized more fully than is generally possible with only one user program, which would often be waiting while devices other than the processor completed data transfer operations. With several programs to be run, the processor can be switched among the programs so that those ready to run have the use of the processor while others are waiting. The use of the processor for several programs at the same time is called multiprogramming.

Running programs in a multiprogrammed system presents several difficulties. Each program can be run at arbitrary times, but all the programs must be capable of running together without conflict. A failure in one program must not be allowed to affect other programs. Each program must be able to use all features of the system in a simple, easily-learned manner, preferably in such a way that the program does not need to be modified to run in a different hardware configuration.

These difficulties are overcome by providing each program with a virtual machine. The programmer writes his program as though it is to run by itself; the program uses any system resources (such as memory or peripheral devices), and the system provides the services necessary to support the program and coordinate it with other programs in operation. The physical hardware in the system is combined with a control, or executive program to simulate a more powerful hardware machine; it is for this more powerful, but abstract, machine that the programs are written.

Based on this discussion, the hardware machine and the executive program must combine to fulfill the following four major objectives of the virtual machine:

a. Mapping — The virtual machine of the program currently in operation must be assigned to some part of the hardware machine.

b. Resource management — The scheduling of programs, and the allocation of parts of the hardware machine, must be performed by the executive program.

c. Communication — The virtual machine must be able to request services from the executive program, and the executive program must be able to transfer data back and forth with the user programs.

d. Protection — The system that supports the virtual machine, and all other virtual machines, must be protected from failures in any one virtual machine.

Each time a program is run (or, if the multiprogramming system is running several programs in a round-robin manner, each time a program resumes operation), it has some of the system hardware allocated to it. This generally includes some part of the memory to contain the instructions and data required by the program, some of the processor's registers, a hardware stack (which is actually an area in the memory and a pointer to that area in a processor register), possibly some peripheral devices, and perhaps a fixed amount of the processor's time. All of these allocations must be made in such a way that the hardware machine can then execute the user program with a minimum of extra operations; i.e., so that the execution of the user program requires as few additional memory cycles, or additional machine cycles, as possible. Therefore, the allocation is done entirely in the hardware machine; registers in the hardware contain all the allocation (mapping) information, and all references to virtual addresses, virtual stack locations, virtual register contents, or virtual devices converted by hardware to physical references.

In the present system, mapping of virtual registers into processor registers, of the virtual stack, and of the virtual program counter, is done by loading the appropriate values into the processor registers; one of two sets of general registers can be selected for the user, and the processor has a separate stack pointer register 15 for user mode, while the program counter 16 is changed by interrupt and trap operations and by conventional return from interrupt (RTI) or return from trap (RTT) instructions.

The remaining mapping functions distribute the virtual memory into the physical memory. In the physical memory, many specific addresses are reserved for special functions; the lowest addresses are used for interrupt and trap vectors, while the highest addresses are used for device registers. Because all the functions that require reserved addresses in the physical memory are performed either by the physical machine or by the control program, these addresses need not be reserved in the virtual machine. Therefore, the programs written to be run in the virtual machine can use any addresses; specifically, these programs can start at address 000000 and continue through ascending addresses to the highest address needed.

In discussions of the virtual memory and the physical memory, it is often necessary to describe the addresses used to select data items within the memory. The range of addresses that it is possible to use is called the address space. The maximum range of addresses that can be used in the virtual machine is called the virtual address space, while the maximum range of physical addresses that can exist in the hardware system is called the physical address space.

If the user program is to use addresses in the virtual address space that are reserved in the physical address space, then the virtual address space must be relocated to some other part of the physical address space. In a multiprogramming system, several user programs, each in its own virtual address space, may be sharing the physical address space. Therefore, the relocation of the virtual address space into the physical address space must be variable; each time a program is run, it may be allocated a different part of the physical address space. The present system provides the capability of varying the relocation for each user program by storing a map of the memory allocation in a set of registers.

In a multiprogramming system, each user program operates in a virtual machine that can utilize any of the possible devices or functions of the physical machine, as well as many functions performed by the executive program. The resources that exist in the system must be allocated to each user program as required, but without allowing conflicts to arise where several user programs require the same resources. The physical machine and the executive program must resolve any protective conflicts by scheduling the resources for use by different programs at different times, and must schedule the user programs to operate when the resources are available.

Within the system, the two most important resources, which require the most care and effort to control, are the memory and the processor.

The processor 1, for the most part, can only operate on one instruction at a time. When several programs are sharing the use of the processor, the processor operates on each program in turn; either the processor is shared among the programs by using periodic interrupts to allow the executive program to transfer the processor to another user program, or each user program runs to completion before the next user program begins. To share the processor on a time basis, the executive program must perform the transfer from one virtual machine to another. Each virtual machine is given control of the physical machine by loading the map of that virtual machine into the physical machine. That is, the executive program changes virtual machines by changing the contents of the processor registers used by the virtual machine, and by changing the contents of the registers which map the virtual address space.

Memory management is much more complicated than processor mangagement. If a program uses a large proportion of the virtual address space, and only a small amount of memory is physically available in the system, the program may be too large to fit into the memory all at once. Fortunately, in most programs, only a small part of the program (or possibly several small parts, one for the instruction stream and one or more for blocks of data) is used at any one time. To take advantage of this fact, the virtual address space is divided into pages so that each page can be mapped separately. Only the pages that are in use in the current instruction are required to be in the physical memory during the execution of that instruction.

If it is necessary for the executive program to bring a page into the physical memory, but all of the physical memory is already in use, the executive program must remove some other page (from the same virtual machine or, in a multiprogramming system, from some other virtual machine) from the physical memory. When a page is removed from the physical memory, a copy of that page must be stored in a mass storage device (such as a disk storage unit included among the additional peripherals 4,7); if a copy of the page is already on the mass storage device, and none of the data (or instructions) stored on the page have been changed, the writing of the page onto the mass storage device can be bypassed. Each time a page must be replaced, the executive program attempts to predict which page is least likely to be used in the future, so that it will not soon need to be moved back into the physical memory.

A program running in a virtual machine must be able to communicate with the executive program, to request various services performed by the executive program, or to determine the status of the system. The same type of communication can be used for communication between virtual machines, by providing intermachine communication as a service through the executive program. The same hardware functions that provide a means for the user program to communicate to the executive program are also used by the executive program to determine the status of the user program when a trap or abort condition occurs.

A user program requests services by executing trap instructions. Abnormal conditions caused by a program failure, such as an odd address for a word data transfer, or an attempt to execute a reserved instruction, cause internal processor traps. In either case, the trap function performed by the processor serves to notify the executive program that an instruction is required. The executive program must then begin executing instructions to perform the requested service or to correct the failure condition, if possible. However, in order for the hardware machine to operate on any program other than the user program, the mapping information must be changed to reflect the allocations used by the new program.

The trapping function performs the change of most of the mapping information. The contents of the program counter register 16 and the processor status register 11 are changed directly; the old contents are stored on a stack in memory pointed to by a stack pointer (13, 14, or 15) and the new contents are supplied from locations called a trap vector. The address of the trap vector is provided by the processor and depends on the type of trap instruction or trap condition, so that for each trap instruction or condition, a different program counter word and processor status word can be supplied.

The only remaining parts of the virtual machine context that require changes are the general register sets 12*a* and 12*b* in the processor 1. These can be changed either by saving the contents of the registers from the previous virtual machine on the hardware stack and loading new contents, or by selecting the alternate set of general registers. As will be discussed more fully hereinafter, register set selection is controlled by bit 11 of the processor status word register 11. To summarize a change of virtual machines, the mapping in the hardware system includes the selection of a register set 12*a* or 12*b*, a stack pointer 13, 14, or 15, a program address (in the program counter 16), an address space, and a processor status word. The trap and interrupt service function, which is performed by the processor as an automatic response to trap an instruction or abnormal condition, can change all of these selections as follows:

The program counter and processor status word are changed directly; and predetermined bits of the new processor status word select the new address space, stack pointer, and register set.

The mapping and selection information for the previous virtual machine is completely saved, either by remaining in unselected portions of the processor or by being stored on the hardware stack. If the selected register set is shared with other virtual machines, the register contents must be changed by an instruction sequence.

When the new virtual machine begins executing a service program for the programmer request (if a trap instruction was executed) or abnormal condition (if a trap condition occurred) the service program must get information from the previous virtual machine. This information may define the status of the previous virtual machine after an abnormal condition occurred so that the service program can correct the condition and restore the correct status before returning control to the previous virtual machine. If the service program is performing a service, the information required from the calling program may define the specific type of service to perform, or provide the addresses of data buffers, or specify device and file names.

Most information required by the service program is stored in the calling program's address space. To get this information, and to return information to the calling program, the service program must be able to operate in the present address space and transfer data in the previous address space, at the same time. The processor 1 provides instructions to do this.

The special instructions that transfer data between virtual address space make use of the processor status word register 11 to specify which address space is being used by the current virtual machine, and which address space was used by the previous machine (this is identified by predetermined bits of the processor status word). The data is transferred between the hardware stack of the current address space and arbitrary addresses of the previous address space. The calculations of the virtual address in the previous address space are performed by the processor using data in the current address space; i.e., any index constants or absolute addresses used to generate the virtual address are taken from the current address space, just as the instructions are.

Because all the mapping and context information for the previous virtual machine is saved when the trap and interrupt service function sets up a new virtual machine, the hardware system can resume the execution of any program at the same point that it was interrupted. This is done with a return from interrupt (RTI) or return from trap (RTT) instruction, which replaces the program counter and processor status words of the current virtual machine with the stored values from the previous virtual machine. The new processor status word selects most of the mapping information, as described previously, so the return instructions completely restore the previous context.

As previously mentioned the hardware system and the executive program must be protected from programming failures in each virtual machine. In addition, most contemporary computer systems provide protection so that no program operating in a virtual machine can take control of the system or affect the operation of the system without authorization. A third form of protection that is useful in a large and complex system is the protection of the executive program against itself. The executive program is divided into a basic, carefully written kernel, which is allowed to perform any operation, and a broader supervisor, which cannot perform privileged operations, but which provides various services useful to the executive program and to the user programs.

The forms of protection provided include the different address spaces for different types of programs, a variety of restricted access modes, and restricted processor operations. The address space protection can be used with any type of program, whether operating in user, kernel, or supervisor mode. The restricted processor operations are usable only in kernel mode; supervisor mode has the same restrictions as user mode. The present invention is directed toward optimizing these means for protecting the executive program.

The most basic protection against modification of the executive program by a user program (or of the kernel section by the supervisor section) is the separation of the address spaces. A program operating in user mode operates in the user address space. It cannot access any physical addresses that are not in that address space, regardless of their correspondence to addresses in any other virtual address space. The executive program by responding to the processor status word (PSW) decoder 20, can prevent a user program from accessing other virtual address spaces through communication instructions by forcing certain bits of the stored processor status word to ONE'S (to reflect user mode) before executing an RTI or RTT instruction to return control to the user program. This forces the "previous mode" bits in the processor status register to take on user mode, just as the current mode bits are set to user mode, and the communication instructions operate only within the user address space.

Certain instructions that affect the operation of the hardware machine are prohibited in the virtual machine. These include the HALT instructions, which stops the physical machine and thus prevents any virtual machines from operating, the RESET instruction, which stops all input/output devices, regardless of which virtual machine they are allocated to, and various processor status change instructions. These instructions are allowed only in kernel mode by logic associated with the processor status word decoder 20 so that the executive program can control the entire hardware system; they are ineffective in the supervisor or user mode. The RESET and set priority level (SPL) instructions are allowed to execute in these modes, but have no effect; the HALT instruction activates a trap function so that the executive program may stop all action for the virtual machine that executed the HALT, but continue other virtual machines.

A program can generally be divided into routines, each of which performs a function that is built up from a sequence of instructions. Often the function performed by a routine is needed in several other routines, so it is desirable to be able to call the routine from many other routines in the program; i.e., the program should be able to transfer the processor to the instructions that execute the function, and then have the processor resume the execution of the instructions following the calling instruction. A routine which is called from other routines is said to be subordinate to those routines and is called a subroutine; the special instructions that transfer the processor to the beginning of a subroutine and that return the processor to the calling routine are called subroutine linkage instructions.

There are some procedures that are most easily implemented as a subroutine that either performs a part of the procedure and then calls itself to perform the rest of the procedure, or completes a computation and returns a partial (and finally, a complete) result. This is called recursive operation.

When a subroutine is called recursively, the linkage information for each call (the information required to return to the calling program) must be saved during subsequent calls. Since a recursive subroutine can be called again before it returns from the first call, the linkage information should not be stored in a fixed location; instead, it is stored in an area, with each linkage in a different location and a pointer that identifies the specific location for each linkage.

Because a subroutine must return control to the routine that called it before that routine can return control to any routine that called the latter routine, the last linkage which has not been used for a return must be the first one used; i.e., the linkages must be used in a last-in, first-out sequence. A storage area whose locations are used for last-in, first-out storage is called a stack; a pointer is used to point to the last entry placed on the stack, and the subroutine linkage instructions that put information on the stack (a push operation), or remove information from the stack (a pop operation), change the contents of the pointer so that it always points to the correct word for the next linkage operation.

In the present system three of the processor's general registers are used by the subroutine linkage instructions as a stack pointer. These registers are designated as the kernel stack pointer 13, the supervisor stack pointer 14, and the user stack pointer 15. In each instance, according to the mode designated by the current processor status word in the register 11, the stack pointer points to the first word in a stack area. The same stack is also used for storage of context or linkage information by trap and interrupt service functions. The traps, interrupts, and subroutine calls are all handled in the same last-in, first-out manner.

Keeping the data storage separate from the program is particularly important for programs and subroutines that can be called from more than one virtual machine. If several virtual machines are executing the same program, it is desirable to have only one copy of the program in the physical memory, and to map each virtual address space into the same physical address space. However, in a multiprogramming system, one virtual machine may begin execution of a program and then be interrupted; a second virtual machine may begin execution of the same virtual program and then run out of time; the original virtual machine may resume execution and complete the program; and the second virtual machine may resume execution. The programmer cannot make any assumptions about where each virtual machine stops, so that program must be capable of being re-entered at any time, regardless of what other virtual machines have done with the program.

Programs designed to store all their data on a stack, so that each virtual machine that uses the program simply uses a different stack, are called re-entrant programs. A different stack pointer is selected each time a different virtual machine is selected (if the executive program changes the context of the user virtual machine, to run a different user, it changes the address mapping of the stack area and the contents of the user stack pointer register 15), so each activation of a program executes the program in complete isolation from other activations by other virtual machines.

The processor status word contains several types of information that control the operation of the processor, and of the system. FIG. 2 is a table which lists the fields within the processor status word.

The current processor mode selects most of the mapping for the virtual machine and determines whether certain instructions are effective or prohibited. The processor mode can be set by moving a data word to the processor status register at its address on the BUS, or through a trap or interrupt service function (which loads a new processor status word from the trap or interrupt vector), or through an RTI or RTT instruction (which restores an old processor status word from the hardware stack).

Programs running in virtual machines are prevented from changing the contents of this field by the processor status word decoder 20. The entire processor status word is protected from direct transfers by being mapped only into the kernel address space. No other virtual machine has any virtual address that corresponds to the physical address of the processor status register 11, so there is no way to transfer data to the register through instructions. The new value of the processor status word used during a trap or interrupt service function is taken from a vector (whose location is specified by a vector address supplied by the interrupting device or by the trap recognition logic) that is located in the kernel address space; again, other programs cannot access the vector storage, and thus, cannot modify the vector contents to affect the processor status word. The RTI and RTT instruction can only set, and not clear (under control of the processor status word decoder 20), these bits, so user programs are prevented from entering other modes while kernel programs can return control to any mode.

The previous processor mode is used primarily by communication instructions to define which address space to communicate with. During "user mode" operation, these bits are set to reflect user mode, so that the user program cannot move data into or out of any other address space. These bits are set to reflect the value contained in the "current mode" bits prior to an interrupt or trap operation. A special kernel mode data transfer is used to fetch the new processor status words from the vector address; however, bits 13 and 12 of the processor status word are not loaded from the data read, but from the old value of bits 15 and 14.

During the return from a trap or interrupt service program (via an RTI or RTT instruction), the old processor status word is restored from the appropriate stack. The "previous mode" bits are protected by the processor status word decoder 20 in a way that prevents user mode programs from altering the bits to allow access to other address spaces. This is done by permitting the bits to be set, but not cleared; since user mode is represented by all ONE's, user mode programs cannot alter these bits, but other types of programs can gain access to user address space.

The register set selection field bit 11, controls which of two sets of general registers 12*a* and 12*b* is used. In general, a user program should use only the register set assigned to it by the executive program; the protection of this field is similar to that for the mode fields, so user programs should run with register set 1 selected to prevent the user from changing the selection. That is, a user program is prevented by processor status word decoder 20 from clearing bit 11.

The following description of the remaining fields of the processor status word is provided to fully disclose its function although certain aspects thereof are not directly applicable to the present invention.

The processor 1 spends most of its time executing instructions in programs that are running in virtual machines. However, a certain part of the processor time is spent servicing interrupts from other devices.

The interrupts indicate that the processor must execute an interrupt service routine to control the operation of the device; for different devices, the interrupts indicate different conditions that have occured. Different devices can tolerate different amounts of delay before the execution of their service programs; the system uses a scheduling system to determine which interrupt service programs should be honored first.

The scheduling system is based on a structure of priorities. Each device that causes interrupts is assigned to a priority level. When the processor is executing a service routine, the processor priority is set to the same level as the interrupt that started the service routine; this blocks all interrupts on the same (or any lower) priority level. Higher priority interrupts are still honored by stacking the context of the current interrupt service routine and loading a new context from an interrupt vector. The use of a hardware stack to store the context information for interrupted routines permits any number of routines to be nested, because each higher level routine must execute to completion and exit (through an RTI instruction) before the lower level routine resumes operation. This last-in, first-out discipline corresponds to the operation of the stack.

In some cases, it is desirable to be able to reschedule part of an interrupt service routine at a different priority. This can occur, for example, when a service routine that normally executes quickly detects an error that requires a long procedure to correct; the error routine should run at a much lower priority. It is preferable to schedule the lower priority section separately, and return control to the interrupted program, so that other high-priority interrupts can be serviced without tying up stack space and other resources with the current interrupt routine.

The same type of program scheduling is useful to the executive program for scheduling different user programs at different priority levels or for scheduling periodic supervisor functions. The processor 1 provides a mechanism for scheduling different priority requests, in the form of a programmed interrupt request (PIRQ) structure. This structure consists of a processor register in which bits can be set to represent interrupt requests at different priority levels, and an interrupt vector generator that supplies a fixed vector address whenever the processor honors an interrupt request from the PIRQ register 22. The PIRQ register is intended to be accessed only in kernel mode so that it is protected from alteration by programs operating in virtual machine; because there is only one request bit for each priority level, there must be a control program for each level that determines what other programs must be run when the request at that level is honored.

In some forms of debugging operations, it is useful to be able to trap to a debugging program after the execution of each instruction in the program being checked. The trace trap is provided to perform this function. The trace (T) bit (bit 4) in the processor status word generates a trace trap, through a fixed vector, whenever it is set to a 1. This trap occurs after the execution of each instruction while the T bit is set.

The T bit is protected against unintentional modification. It can only be set or cleared during the interrupt or trap response function, from a vector containing a new processor status value; or during the execution of an RTI or RTT instruction, from an old processor status word on the stack. When data is transferred to the processor status word address by any other instruction, the value of the T bit is unaffected despite any value in the transmitted data.

The four least-significant bits, 3–0, of the processor status word contain the processor condition codes. These bits store information about the value resulting from any data manipulation during an instruction. The condition codes are not altered to reflect the results of address calculations, but are changed only when an instruction explicitly operates on an explicit unit of data.

The condition codes can also be set to any specific value by transferring a word containing that value to the processor status word address. The value of the condition codes are altered by every interrupt or trap response function, and by every RTI or RTT instruction. In addition, individual condition-code bits may be manipulated directly, with the condition-code operate instructions. These instructions provide a means to set any one or more of the condition codes with a single instruction that requires only one memory reference; a similar set of instructions can clear any one or more bits. The condition codes are used in conditional branch instructions, so the various means of manipulating the condition codes are useful because they permit setting up the processor status word to respond in a particular way to various branch instructions.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

There is described a specific embodiment of this invention. It is, however, the intent of the appended claims to cover all such variations and modifications as come within the true spirit and scope of this invention.

We claim:

1. A data processing system comprising:

A. a memory unit for storing sequences of instructions and data as programs, each program being classified in one of a predetermined number of operating modes, the memory unit also storing a processor status word corresponding to each program to identify the operating mode of that program, and B. a processor unit including:

i. a group of registers identified by operand addresses in instructions, said group including a number of sets of general registers which is less than the predetermined number of operating modes, a register corresponding to each mode operable as a stack pointer, and a single register operable as a program counter, ii. a processor status word register for receiving a processor status wored corresponding to a program being processed each time said processor unit begins to process a program, iii. a processor status word decoder including a first means for decoding a first portion of the processor status word to identify the current operating mode and the corresponding stack pointer register, and iv. means responsive to an operand address and signals from said first decoding means identifying the current operating mode and the stack pointer for addressing a selected one of said registers, each program thereby using a set of general registers, a stack pointer corresponding to the operating mode and the program counter.

2. A system as recited in claim 1 wherein said processor unit comprises a plurality of sets of general registers, and said processor status word decoder includes second means for decoding a second portion of the processor status word for enabling one of such said general register sets.

3. A system as recited in claim 2 wherein said system has three operating modes and said group of registers has two sets of general registers and three stack pointer registers.

4. A system as recited in claim 3 wherein one operating mode is designated a kernel mode, a corresponding signal from said first decoding means enabling the execution of predetermined instructions during the kernel mode only.

5. A system as recited in claim 1 wherein a third portion of said processor status word register stores information specifying the previous mode in which said processor was operating immediately prior to the mode specified in a first portion of said processor status word register which stores the first portion of the processor status word, said processor being operable in three modes and additionally including:

i. means for transferring status words to said processor status word register, and ii. control means enabled in response to predetermined instructions and signals from said first decoder means indicating said processor is operating in either a first or second mode, said control means, when enabled, preventing said transfer means from transferring to said third processor status word register portion signals indicating the previous mode was a third mode or a second mode when said first decoder means indicates respectively that the processor is operating in the first or second modes or in the first mode.

6. A system as recited in claim 5 wherein the first mode is a user mode and said processor status word decoder is responsive to a signal from first decoding means indicating user mode for enabling said program to address the second portion of the processor status word to identify one predetermined register set whereby user mode programs are inhibited from using the other general register sets.

* * * * *